United States Patent [19]

Auslander et al.

[11] Patent Number: 4,656,583

[45] Date of Patent: Apr. 7, 1987

[54] METHOD FOR IMPROVING GLOBAL COMMON SUBEXPRESSION ELIMINATION AND CODE MOTION IN AN OPTIMIZING COMPILER

[75] Inventors: Marc A. Auslander, Millwood; John Cocke, Bedford; Peter W. Markstein, Yorktown Heights, all of N.Y.

[73] Assignee: International Business Machines Corporation, Armonk, N.Y.

[21] Appl. No.: 640,283

[22] Filed: Aug. 13, 1984

[51] Int. Cl.$^4$ .............................................. G06F 9/44
[52] U.S. Cl. .................................................... 364/300
[58] Field of Search ......................................... 364/300

[56] References Cited

U.S. PATENT DOCUMENTS 4,571,678 2/1986 Chaitin ................................ 364/300

Primary Examiner—Raulfe B. Zache
Attorney, Agent, or Firm—Roy R. Schlemmer

[57] ABSTRACT

A method for use during the optimizatin phase of an optimizing compiler for performing global common subexpression elimination and code motion which comprises:

Determining the code 'basis' for the object program which includes examining each basic block of code and determining the 'basis' items on which each computation depends wherein 'basis' items are defined as operands which are referenced in a basic block before being computed. The method next determines the "kill set" for each 'basis' item. Following this UEX, DEX, and THRU are determined for each basic block using the previously determined 'basis' and "kill set" information. AVAIL and INSERT are computed from UEX, DEX, and THRU, and appropriate code insertions are made at those locations indicated by the preceding step, and finally redundant code is removed using the AVAIL set.

8 Claims, 3 Drawing Figures

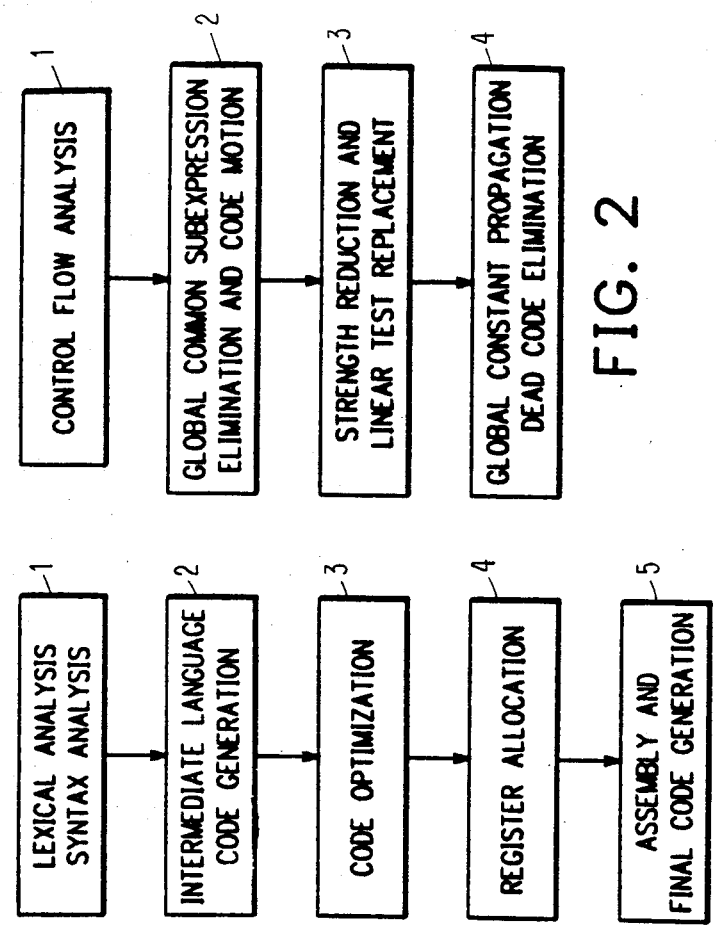

METHOD FOR IMPROVING GLOBAL COMMON SUBEXPRESSION ELIMINATION AND CODE MOTION IN AN OPTIMIZING COMPILER

FIELD OF THE INVENTION

This invention has particular utility in a compiler in which optimization algorithms are used to improve the quality of the code. In particular, this invention improves the time to perform the optimizations known as common subexpression elimination and code motion. Further, this invention is intended to increase the effectiveness of the above mentioned optimizations.

While the invention will find utility in optimizing compilers for all types of computers, it has particular significance for reduced instruction set computers, for which the code produced by compilers is often more voluminous than code produced for complex instruction set computers, because each instruction of a reduced instruction set computer is simpler and performs less function. There is more opportunity and need for optimization in code produced for a reduced instruction set computer.

The quality of code produced by compilers has been an issue ever since the first compiler was produced. One of the principal objectives of IBM's FORTRAN I compiler, the first commercially available compiler, was to project object code in the field of scientific computation which was comparable in code quality to that produced directly by assembly language programmers coding by 'hand'.

Today, higher level languages are designed to be used in every field in which computers are applicable. Even the original FORTRAN language has been bolstered to make it applicable to a wide range of programming tasks. However, it is still important that the quality of code produced by the compiler be high, especially if the resultant code is to be used in a production environment. Code produced by a skilled assembly language programmer is still the yardstick against which compiler produced code is measured.

A large number of optimization techniques have been developed and refined since the 1950's to improve the quality of compiler generated code. Indeed, many of these optimizations were known in principle, and used in some fashion by the team that produced the first FORTRAN compiler.

Optimizations that are frequently employed in optimizing compilers include common subexpression elimination, moving code from regions of high execution frequency to regions of low execution frequency (code motion), dead code elimination, reduction in strength (replacing a slow operation by an equivalent fast operation), and constant propagation. Descriptions of these otpimizations can be found in:

J. T. Schwartz, *On Programming—An Interim Report on the SETL Language. Installment II: The SETL Language and Examples of Its Use*, Courant Institute of Math Sciences, NYU, 1983, pp. 293-310.

E. Morel and C. Renvoise—*Global Optimization by Suppression of Partial Redundancies*, CACM, Vol. 22, No. 2, pp. 96-103, 1979.

A. Aho, J. Ullman, *Principles of Compiler Design*, Addison Wesley, 1977.

Global common subexpression elimination and code motion are among the most important optimizations. Measurements have shown that these optimizations have a larger effect on code improvement than any of the other optimizations. Many articles in the literature discuss how to perform this optimization; the first two of the above citations contain excellent accounts of how to determine where in a program, copy of code should be inserted in order to allow original code to become redundant and subject to elimination. These articles also describe how to determine where redundant code exists. The methods depend on the program's flow graph, and a knowledge of certain properties which can be determined by examining basic blocks one at a time. These properties are:

DEX (downward exposed expressions). The set of computations which if executed at the end of a basic block give the same result such as when executed "in place."

UEX (upward exposed computations). The set of computation which if executed at the beginning of a basic block give the same result as when executed "in place."

THRU The set of computations which if computed at the beginning or end of the basic block would give the same results.

The above mentioned references decribe how to perform global common subexpression elimination and code motion on the premise that the above-mentioned sets are known for every basic block. In particular, these references describe how to compute the set of computations to be inserted at the end of certain basic blocks to achieve the effect of code motion, based on the sets, DEX, UEX, and THRU. These computations are well known to those skilled in the art.

However, unless care is taken in computing UEX, DEX, and THRU, the commoning and code motion algorithms may only common and/or move the first of a sequence of related computations. For example, consider the code fragment of TABLE I.

TABLE I

| OPS. | INST. | MEANING |
| --- | --- | --- |
| 1 | L R100,A | Fetch contents of A into register 100 |
| 2 | L R101,B | Fetch contents of B into register 101 |
| 3 | Add R102,R100,R101 | Set Reg. 102 to the sum of contents of R100 and R101 |
| 4 | ST R102,C | Set contents of C to the contents of R102 |

It is easy not to put the computation of R102 (Op 3) into UEX for a basic block consisting of the code in TABLE I because R100 and R101 may not have the same values on entering the basic block as they do when the *Add* instruction is encountered. Thus if TABLE I is code in an inner loop in which A and B are unchanged, only R100 (Op 1) and R101 (Op 2) would obviously belong in UEX (which is the instrumental set in determining code motion), Then, after applying commoning of code motion, the computation of R102 (Op 3) still remains in the loop and another application of the algorithm would be required to move the computation of R102.

DESCRIPTION OF THE PRIOR ART

U.S. Pat. No. 4,309,756 discloses a method for evaluating certain logical computations. The disclosed concepts are narrow in scope and anachronistic for a patent issued in 1982. It is primarily background art in that it sheds no light on naming computations so that potentially redundant computations are given the same name.

UK Pat. No. 1,413,938 is concerned with techniques for testing compiler output for correctness. It should be used to test the correctness of code generated by an optimizing compiler. However, it bears no relevance to how the optimizing compiler generates code in general, or how it achieves its optimizations.

U.S. Pat. No. 4,277,862 uses hashing to maintain a virtual address translation mechanism. The present invention used hashing to quickly reference computations previously encountered in the compilation process. However, hashing is a minor detail in the embodiment of our invention. The present invention teaches deriving a 'basis' for computations, and it is shown how expressing all computations in terms of 'basis' elements enables global common subexpression elimination and code motion to operate expeditiously.

Related Applications

Copending application Ser. No. 640,285 entitled "A Method of Developing Formal Identities and Program Bases in an Optimizing Compiler" teaches that under certain code generation strategies, a 'basis' can be selected during the intermediate code generation process. It is not necessary to wait for code generation to be completed to determine a 'basis'. In such cases, all computations can be expressed in terms of the 'basis' immediately during intermediate code generation. The PL/1L compiler, which is discussed in Cocke, J. and Markstein, P., *Measurement of Program Improvement Algorithms,* Proc. IFIP Cong. 1980, Tokyo, Japan Oct. 6-9, 1980, Melbourne, Australia, Oct. 14-17, 1980, pp. 221-228, uses a code generation strategy, and intrinsically produces information from which 'basis' could be determined on the fly during intermediate language code generation. However, this article neither disclosures nor suggest the generation or use of a 'basis'.

The term intermediate language as used herein is one used by the compiler to represent the program being translated. It is usually at a lower level than the source language and a higher level than the target language. Optimizing compilers transform intermediate language programs into equivalent, but better, intermediate language programs. It is to be understood that this phase of the compilation is known in the art and is not considered to be novel per se. It is described herein merely to complete the description of the present invention. This operation is performed in block 1 of FIG. 2.

SUMMARY AND OBJECTS OF THE INVENTION

It is a primary object of the present invention to provide an optimizing compiler with a module which allows several related computations to be commoned or moved with a single pass of a commoning and code motion algorithm.

It is a further object of the invention to utilize the concept of computing a 'basis' for a program. All computations in the program can be expressed in terms of the basis elements.

It is a further object of the invention to show how the 'basis' of a program can be used to compute the set of upward exposed expressions, which is necessary to perform global commoning and code motion algorithms. The set of upward exposed expressions is computed, using the 'basis', in such a manner, as to allow several related computations to be commoned or moved with just one pass of a commoning or code motion algorithm.

It is further object of the invention to show how the 'basis' of a program can be used to compute the set of downward exposed expressions, which is necessary to perform global commoning and code motion algorithms. The set of downward exposed expressions is computed, using the basis, in such a manner as to allow several related computations to be commoned or moved with just one pass of a commoning or code motion algorithm.

It is further object of the invention to show how the basis of a program can be used to compute the set of unaffected computations, which is necessary to perform global commoning and code motion algorithms. The set of unaffected computations is computed, using the basis, in such a manner to allow several related computations to be commoned or moved with just one pass of a commoning or code motion algorithm.

It is a further object of the invention to show how to compute the "kill sets", which for each basis item are the non-basis computations which depend on the value of the 'basis' item. The set of upward exposed expressions, downward exposed expressions, and unaffected expressions are most readily computed in terms of the kill sets.

It is a further object of the invention to show how to use the kill sets to propagate the set of available computations while examining the computations in a basic block for the purpose of removing redundant code.

The objects of the present invention are accomplished in general by a method for use during the optimization phase of an optimizing compiler for performing global common subexpression elimination and code motion which comprises:

determining the 'basis' for the intermediate language program, determining the 'basis' items on which each computation depends, determining the "kill set" for each 'basis' item, determining UEX, DEX, and THRU for each basic block using the previously determined "basis" and "kill set" information, computing AVAIL and INSERT from UEX, DEX, and THRU, making appropriate code insertions at those locations indicated by said proceeding step, and removing redundant code using the AVAIL set.

DESCRIPTION OF THE DRAWINGS

FIG. 1 is a very high level functional flowchart of an optimizing compiler in which the present invention has particular utility.

FIG. 2 is a high level flowchart of the herein disclosed compiler module for effecting the desired commoning and code motion.

DISCLOSURE OF THE INVENTION

Figure 3:
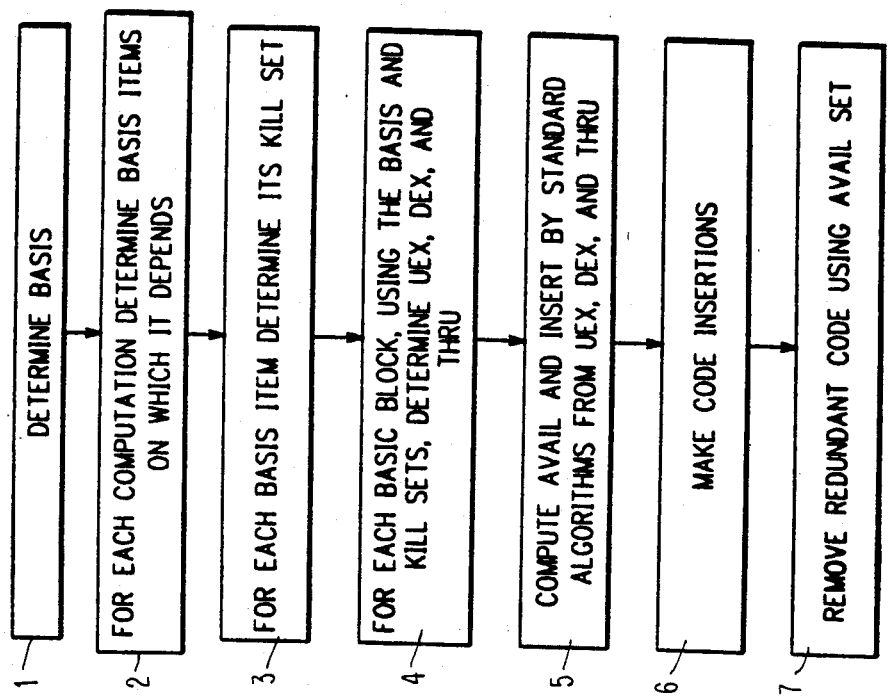
FIG. 3 is a high level flowchart of the global common subexpression and code motion algorithm which is used in an optimizing compiler, and in which the present invention has utility.

The present invention provides a mechanism which allows larger sets to be recognized for UEX, DEX and/or THRU, and thus greater amounts of code can be commoned or moved with one application of the algorithm.

The figures which comprise the flowcharts of the present invention (e.g. FIG. 3) are largely self explanatory. FIG. 1 is a very high level flowchart for a compiler as is well known in the art. Blocks 1, 2, 4 and 5 are quite straightforward and well known. Block 3 entitled Code Optimization is the phase of the compiler activity to which the present invention applies.

FIG. 2 is a flowchart of the optimization phase for such an optimizing compiler. The operations performed in Blocks 1, 3 and 4 are straightforward and well known in the art. Block 2 is the area of the optimizing compiler to which the present invention applies. This block is shown expanded in FIG. 3.

FIG. 3 is a flowchart for the global commoning and code motion phase of the compiler. As stated previously in the specification, this overall objective is well known in compiler design. The specific manner in which the operations are performed will be described subsequently in functional terms.

Blocks 4, 5, 6 and 7 are generally known in the art of optimizing compilers as stated previously. The operations are described in terms of the functions performed in the following general description of the overall operation of the 'global common subexpression elimination of code motion' phase of a typical optimizing compiler utilizing the present invention.

Specific subprograms for performing these operations are set forth in Appendices I and III-VI for convenience of reference. Appendices I and II comprise the subprograms which perform the operations delineated in Blocks 1, 2 and 3 of FIG. 3 which operations comprise the heart of the present invention.

The method requires the following steps set forth for convenience of reference in an essentially tabular format:

1. Examine each basic block for items which are used as operands without having been previously defined within that basic block. The collection of such items over all basic blocks is called the 'basis' for the program. For example, for the code fragment of the TABLE I, A and B are members of the basis. Concisely a non 'basis' item is one which *has* been previously defined.

A basic block is a set of instructions which can only be entered from outside of the set via the first instruction. Each instruction in the basic block except the last, has exactly one successor and that successor is in the basic block. This is also called straight line code.

2. For the computation of each non-basis item, determine the subset of basis items on which it depends. This may be determined by the following recursive procedure: For the set of operands of a computation, replace each non-basis operand by the basis items on which that operand depends.

Thus, all computations can be viewed as functions of basis items, rather than on the operands that appear explicitly in the instruction for the computation.

3. Next, using the sets formed in the above step, it is necessary to find the collection of non-basis items which depend on each basis item. For each member of the basis, the set of non-basis items which depends on it is called the *kill set* of the basis element. Note that if a basis element has its value changed (by virtue of being recomputed), all members of its kill set would receive different values if recomputed *thereafter*. Thus, for the fragment of code in TABLE I, A and B would be basis items, and the kill sets for A and B are:

kill (A)=(R100, R102)
   kill (B)=(R101, R102)

4. The sets DEX, UEX, and THRU for each basic block can now be formed as follows:

a. Initialize DEX and UEX to the empty set. Initialize THRU to the set of all computations of interest. Before any instructions are examined, no basis items have been seen to have been computed, and thus no computations depending on them have been determined to have been killed. In the next step, as basis items are computed, the kill set of the recomputed basis items is removed from DEX, and THRU.

b. Examine the instructions in the basic block in execution order. Add to DEX every non-basis computation encountered. Add to UEX every non-basis computation encountered, providing it is also in THRU. Whenever a basis item is computed, remove from DEX and remove from THRU any members, which are also members of the basis item's kill set.

c. An alternative method for computing UEX is to examine the instructions in a basic block in reverse execution order. Add to UEX every non-basis computation encountered. Whenever a basis item is computed, remove from UEX any members, which are also members of the basis item's kill set. For anyone skilled in the art, it should be easy to prove that the two methods for computing UEX are equivalent.

5. When inserting code into a basic block as a consequence of applying algorithms such as given in the references, one must be careful to observe the following: If a computation X to be inserted has an operand Y whose computation is also to be inserted into that basic block, insert the computation of the operand Y first. Without the techniques in this invention, such a condition could not arise, because Y preceding X in a basic block would cause X to appear not to be upward exposed. Since the set of computations to be inserted is unordered, this observation serves to impose an ordering on inserted computations when order is required.

6. When using the set of available computations (AVAIL) which are derived from DEX, UEX, and THRU, examine each instruction of a basic block in execution order. If a computation is in AVAIL, it can be discarded as redundant. It a computation is not in AVAIL, the a. If the instruction computes a non-basis item, add the non-basis item to the set of available computations, AVAIL.

b. If the instruction computes a basis item, remove from AVAIL the members of the basis item's kill set which are currently also members of AVAIL.

The following Example illustrates the use of the present invention on a comparatively long list of code. The example shows Basis items Kill Sets identified and compiled for use is subsequent operations to from UEX, DEX and THRU. It also illustrates how the resultants UEX, DEX and THRU lists would have appeared without the use of the present invention.

EXAMPLE

Below, is a sample PL/1 program to illustrate our invention:

```
1  | test: proc;
2  | dcl i fixed bin;
3  | dcl (j, k) fixed bin external;
4  | dcl a(10) fixed bin;
5  | do i = 1 to 10;
6  |   a(i) = j + k;
7  |   end;
8  | return;
9  | end;
```

The numbers to the left of each line of PL/1 are merely for identification. After code generation, our compiler has produced the following code. In the intermediate language listing, the numbers to the left indicate which line of source code caused that line of intermediate language text to be generated. To make the code easier to follow, we point out that the RET operation marks the return from the subprogram. LHA and STHA are half word load from memory and store to memory, respectively. LR copies the contents of the right operand into the contents of the left operand (it is mnemonic for Load Register). BF is mnemonic for Branch on False. It causes flow of control to go to the label specified in the last operand based if a bit in the register specified by the first operand is zero. The bit to be examined is given by the second operand. As used in the example, the CI instruction followed by the BF cause control to flow to label %3 if the contents of R100 is not greater than 10. The other operation codes are self evident to those skilled in the art, and in the intermediate language notation, the leftmost operand is the result of performing the operation indicated, on the Basic Block 1
| | | |
|---|---|---|
| 1 | ST | r118,/.STATIC(r15) |
| 1 | MR | r111,r118 |
| 5 | LI | r98,1 |
| 5 | STHA | r98,I(r15) |
| 5 | LR | r100,r98 |

Basic Block 2
| | | |
|---|---|---|
| 6 %3: | | |
| 6 | LHA | r100,I(r15) |
| 6 | SI | r106,r100,1 |
| 6 | MPY | r109,r106,2 |
| 6 | L | r111,/.STATIC(r15) |
| 6 | L | r112,.J(r111) |
| 6 | LHA | r114,J(r112) |
| 6 | L | r113,.K(r111) |
| 6 | LHA | r115,K(r113) |
| 6 | A | r116,r114,r115 |
| 6 | STHA | r116,A(r15,r109) |
| 5 | AI | r101,r100,1 |
| 5 | STHA | r101,I(r15) |
| 5 | LR | r100,r101 |
| 5 | CI | r102,r100,10 |
| 5 | BF | r102,27/gt,%3 |

Basic Block 3
| | | |
|---|---|---|
| 9 | RET | TEST |

Following p.9 step 1 of the disclosure, we determine the basis to be:

R118
R15
I
/.STATIC
.J
J
.K
K

Following step 2 of the disclosure, we find the following dependencies for each non-basis item:

| | |
|---|---|
| R100 | I, R15 |
| R101 | I, R15 |
| R102 | I, R15 |
| R106 | I, R15 |
| R109 | I, R15 |
| R111 | R15, R118, /.STATIC |
| R112 | R15, R118, /.STATIC, .J |
| R113 | R15, R118, /.STATIC, .K |
| R114 | R15, R118, /.STATIC, .J, J |
| R115 | R15, R118, /.STATIC, .K, K |
| R116 | R15, R118, /.STATIC, .J, .K, J, K |

Performing step 3 gives us the following kill sets for the basis items:

| basis | kill set |
|---|---|
| R15 | R100, R101, R102, R106, R111, R112, R113, R114, R115, R116 |
| R118 | R111, R112, R113, R114, R115, R116 |
| /.STATIC | R111, R112, R113, R114, R115, R116 |
| .J | R112, R114, R116 |
| J | R114, R116 |
| .K | R113, R115, R116 |
| K | R115, R116 |

The sets DEX, UEX, and THRU are then determined for the basic blocks by step 4, yielding:

Basic Block 1:
dex(1)   R98, R100, R111
uex(1)   R98
thru(1)  empty set

Basic Block 2:
dex(2)   R100, R102, R111, R112, R113, R114, R115, R116
uex(2)   R100, R101, R106, R109, R111, R112, R113, R114, R115, R116
thru(2)  R98

Basic Block 3:
dex(3)   empty set
uex(3)   empty set
thru(3)  R98, R100, R101, R106, R109, R111, R112, R113, R114, R115, R116

Following the algorithm suggested in step 5, the sets AVAIL and THRU, and the auxilliary sets GDX, GUX, PAX, CIE, and CIX are calculated to be:

Basic Block 1
gdx(1)    R98, R100, R111
gux(1)    R98
pax(1)    empty set
cie(1)    empty set
cix(1)    R100, R111, R112, R113, R114, R115, R116
insert(1) R112, R113, R114, R115, R116
avail(1)  empty set Basic Block 2
gdx(2)    R98, R100, R102, R111, R112, R113, R114, R115, R116
gux(2)    R100, R101, R106, R109, R111, R112, R113, R114, R115, R116
pax(2)    R98, R100, R102, R111, R112, R113, R114, R115, R116
cie(2)    R100, R111, R112, R113, R114, R115, R116
cix(2)    empty set
insert(2) empty set
avail(2)  R100, R111, R112, R113, R114, R115, R116

Basic Block 3
gdx(3)    R98, R100, R102, R111, R112, R113, R114, R115, R116
gux(3)    empty set
pax(3)    R98, R100, R102, R111, R112, R113, R114, R115, R116
cie(3)    empty set
cix(3)    empty set

| | | |
|---|---|---|
| insert(3) | empty set | |
| avail(3) | empty set | |

As a result of performing code insertion as described in step 5, and redundant code elimination as described in step 6, the program which follows is obtained. (Lines with identification '9999' are lines of code which result from the code insertin program.) Compare this intermediate code program with the one above to see the change in the program:

| Basic Block 1 | | |
|---|---|---|
| 1 | ST | r118,/.STATIC(r15) |
| 1 | LR | r111,r118 |
| 5 | LI | r98,1 |
| 5 | STHA | r98,I(r15) |
| 5 | LR | r100,r98 |
| 9999 | L | r112,.J(r111) |
| 9999 | L | r113,.K(r111) |
| 9999 | LHA | r114,J(r112) |
| 9999 | LHA | r115,K(r113) |
| 9999 | A | r116,r114,r115 |
| Basic Block 2 | | |
| 6 %3: | | |
| 6 | SI | r106,r100,1 |
| 6 | MPY | r109,r106,2 |
| 6 | STHA | r116,A(r15,r109) |
| 5 | AI | r101,r100,1 |
| 5 | STHA | r101,I(r15) |
| 5 | LR | r100,r101 |
| 5 | CI | r102,r100,10 |
| 5 | BF | r102,27/gt,%3 |
| Basic Block 3 | | |
| 9 | RET | TEST |

To see the advantage of the present invention, if the commoning and code motion algorithm has been applied without the concepts of basis and kill sets, DEX, UEX, and THRU might have been determined to be:

Basic Block 1:
dex(1) R98, R100, R111
uex(1) R98
thru(1) empty set
Basic Block 2:
dex(2) R100, R102, R111, R112, R113, R114, R115, R116
uex(2) R100, R111
thru(2) R98
Basic Block 3:
dex(3) empty set
uex(3) empty set
thru(3) R98, R100, R101, R106, R109, R111, R112, R113, R114, R115,R116

As a consequence, only instructions to compute R100 and R111 would have been candidates for code motion. The program would transform to:

| Basic Block 1 | | |
|---|---|---|
| 1 | ST | r118,/.STATIC(r15) |
| 1 | MR | r111,r118 |
| 5 | LI | r98,1 |
| 5 | STHA | r98,I(r15) |
| 5 | LR | r100,r98 |
| Basic Block 2 | | |
| 6 %3: | | |
| 6 | SI | r106,r100,1 |
| 6 | MPY | r109,r106,2 |
| 6 | L | r112,.J(r111) |
| 6 | LHA | r114,J(r112) |
| 6 | L | r113,.K(r111) |
| 6 | LHA | r115,K(r113) |
| 6 | A | r116,r114,r115 |
| 6 | STHA | r116,A(r15,r109) |
| 5 | AI | r101,r100,1 |
| 5 | STHA | r101,I(r15) |
| 5 | LR | r100,r101 |
| 5 | CI | r102,r100,10 |
| 5 | BF | r102,27/gt,%3 |
| Basic Block 3 | | |
| 9 | RET | TEST |

Notice that five instructions were left inside the loop. Three additional applications of the commoning and code motion process would be required without the present invention to achieve the same result that the procedure of the present invention achieved in one application of the commoning and code motion algorithm.

The following is a brief mathematical description of the use of UEX, DEX and THRU lists. More particularly, it discusses the function of the AVAIL and INSERT lists and their use in producing the final output from the procedure set forth in FIG. 3.

For each basic block B, it is necessary to determine the following sets of computations, from UEX, DEX, and THRU:

avail(B): Those computations whose results are valid when basic block B is entered.

insert(B): Those computations which actually will be inserted at the end of basic block B, in order to make other computations become redundant. Code motion is really achieved by judicious code insertion and code removal.

The references cited previously give several techniques for computing AVAIL and INSERT from UEX, DEX, and THRU. There are several different criteria for deciding when to move code. The reader is advised to consult all the references cited previously to get several different points of view. To make the present invention self-contained, Morel and Renvoise's method will be followed for computing AVAIL and INSERT. The reader is urged to read their paper for justification of their method.

To compute AVAIL and INSERT five auxilliary sets of computations are introduced for each basic block:

gux(B): Globally upward exposed computations. These computations, if performed at the beginning of basic block B will give the same result as the computation would give when executed in place (not necessarily in the basic block B).

gdx(B): Globally downward exposed computations. These computations, if performed at the end of basic block B will give the same result as when they were executed previously, regardless of previous control flow.

pax(B): Partially available computations. There exists at least one control flow path along which these computations have been performed and gave the same result as would be obtained by performing the computations at the beginning of basic block B.

cix(B): Computations which could be inserted at the exit of basic block b, and whose insertion would guarantee making the same instruction redundant along every control flow path leaving basic block B.

cie(B): Computations which could be inserted at the Entry to basic block b, and whose insertion would guarantee making the same instruction redundant along every control flow path entering basic block B.
The equations which define these sets of computations are as follows:

$$gux(b) = uex(b) \bigcap_{s \in successor(b)} gux(s) \; thru(b) \quad (1)$$

$$gdx(b) = dex(b) \bigcup_{p \in predecessor(b)} \{dex(p) \; gdx(p) \; thru(p)\} \quad (2)$$

$$pax(b) = \bigcap_{p \in predecessor(b)} \{dex(p) \; pax(p) \; thru(p)\} \quad (3)$$

$$cix(b) = \bigcap_{s \in successor(b)} cie(s) \quad (4)$$

$$cie(b) = \bigcup_{p \in predecessor(b)} \begin{array}{c} gux(b) \; (uex(b) \; cix(b) \; thru((b)) \\ (pax(b) \; (thru(b) - uex(b))) \\ (cix(p) \; gdx(p)) \end{array} \quad (5)$$

$$insert(b) = pix(b) - gdx(b) - (pie(b) \; thru(b)) \quad (6)$$

$$avail(b) = pie(b) \; uex(b) \quad (7)$$

One method for solving these equations is to initialize gux(b) and pax(b) to the empty set for all basic blocks b, and to initialize gdx(b) to the set of all computations for all basic blocks except for the entry basic block, for which gdx(entry basic block) is initialized to the empty set. (The entry basic block represents the code which is executed when control first enters the program being compiled.) Equations (1), (2), and (3) are each solved by recomputing gux(b), gdx(b), and pax(b) respectively, repeatedly for all basic blocks, until recomputation does not change the sets of any of the basic blocks.

Having calculated gux(b), gdx(b), and pax(b) for all basic blocks b, we next solve equations (4) and (5) concurrently. Initialize pie(b) and pix(b) to the set of all expressions with two exceptions. pie(entry block) and pix(exit block) are initialized to the empty set. Then repeatedly recompute both pix(b) and pie(b) from equations (4) and (5) for all basic blocks b until recomputation does not change the sets for any of the basic blocks.

Finally, insert(b) and avail(b) can be computed directly from equations (6) and (7) using uex(b) and thru(b), and the results of having computed gdx(b), and pix(b) and pie(b).

The following table concisely relates to the Appendices I thru VI to the blocks of FIG. 3. These subprograms code fragments are written in PL/1 code and are sufficiently annotated as to allow any skilled programmers to utilize the present invention in an optimizing compiler in either the form shown or to easily rewrite the subprograms in another target language which would be more compatible with his compiler.

As stated previously the programs set forth in Appendices I and II represent the subject matter of the present invention as set forth in Blocks 1, 2 and 3 of FIG. 3 and the remaining Appendices II through VI represent programs which perform the operations specified in Blocks 4 thru 7 of FIG. 3.

APPENDEX REFERENCE TABLE

| Appendix No. | Block of FIG. 3 |
| --- | --- |
| 1 | 1 |
| 2 | 2 & 3 |
| 3 | 4 |
| 4 | 5 |
| 5 | 6 |
| 6 | 7 |

APPENDIX 1

```
/* CODE FRAGMENT TO DETERMINE THE BASIS*/

$zero(seen);            /*initialize expressions seen in basic block*/
$zero(a_basis);         /*initialize basis*/
/* Notes for reading this code:
   r is shorthand for operand(i), the i-th operand of an instruction
   x->def is shorthand for the number of results defined by the
          instruction at x
   x->use is shorthand for the number of results and input operands
          in the instruction at x
This shorthand is effective via macro instructions (not shown here)
*/ do b = b_begin to b_end;    /*walk thru every basic block*/
   do x = bl_begin(b) repeat x->il_fc until (x = bl_end(b));
          /*look at every instruction of the basic block*/
      do i = x->def + 1 to x->use;    /*look at every operand*/
         if a_basis(r) then iterate;  /*already in basis?*/
         if seen(r) then iterate;     /*already defined in block?*/
         a_basis(r) = '1'B;           /*add to basis*/
      end;
      do i = 0 to x->def;    /*Now look at all result and mark */
                             /*them as computed before used, */
         seen(r) = '1'B;     /*register that is defined*/d */
      end do i;
   end do x;
   do x = bl_end(b) repeat x->il_bc until (x = bl_begin(b));
```

```
   do i = 0 to x->def;    /*This walk resets the seen bits*/
      seen(r) = '0'B;     /*for the walk of the next basic block*/
      end do i;
   end do x;
end do b;
```

APPENDIX 2

```
PM_GKV: PROC(G) ;
   DCL
      G OFFSET (PROCS) VALUE,
      ONES LITERALLY('(32)''1''B'),
      ZEROS LITERALLY('(32)''0''B'),
      BITS BIT(32),
      PM_TR  ENTRY (FIXED BIN VALUE),
      PM_SKV ENTRY (BIT(32) VALUE),
      (A, B, I, J, K, N, S, NM, SM, Z) FIXED BIN,
      KX BIT(16) ALIGNED,
      ;

DO I = 0 TO KLNW;
      SEEN(I) = ZEROS;
      ACTIVE(I), COND_REG(I) = ONES;
      END;

IF INDEBUG('PMG') ¬= 0 THEN DO;
      DO I = 1 TO KLN;
         CALL BOTH (LPAD(I,5) || LPAD(LL(I),5) ) ;
         END;
      CALL BOTH ('VARIABLES');
      DO I = 1 TO KLS;
         CALL BOTH (LPAD(I,5) || LPAD(SL(I),5) ) ;
         END;
      END;

/*HAVING GOTTEN THE EXPRESSIONS AND KILLING VARIABLES, NOW DETERMINE
   WHICH EXPRESSIONS ARE KILLED BY EACH VARIABLE.  SCAN THRU THE PROGRAMS
   FIRST ORDER INTERVALS, AND FOR EACH EXPRESSION, ZERO THE BIT CORRESPONDING
   TO THAT EXPRESSION IN EACH VECTOR IN WHICH A ZERO BIT FOR ONE OF ITS ARGUMENT
   APPEARS.*/

/*INITIALIZE ALL KILL VECTORS TO 1S.  EXPRESSIONS KILLED GET A 0 BIT*/
   S = KLS;
   N = KLN;
   DO I = 1 TO S+1;
      DO J = 0 TO KLNW;
         KL(I, J) = ONES;
         END /*DO J*/;
      END;

DO I = 0 TO HBOUND(DANGER,1);
      DANGER(I) = ZEROS;
      END /*INITIALIZE VECTOR OF DANGEROUS EXPRESSIONS*/;

DO I = KLN TO 1 BY -1 ;
         /*LOOK AT IMPORTANT REGISTERS IN REVERSE NUMERIC ORDER*/
      IF ¬SUBSTR(SEEN((I-1)/32), 1+MOD(I-1,32), 1) THEN DO;
         CALL PM_TR(I);
         END /*IF NOT SEEN*/;
      END /*DO I*/;

/*NOW TAKE KILLING DUE TO SUBROUTINE CALLS, ALIASING, ETC. INTO ACCOUNT*/
   CALL PM_SKV('A000'XB) ;
```

RETURN;

```
  /**OFF*/ % NOPRINT; % INCLUDE FORM/*NOPRINT*/; % PRINT; /**ON*/
  /**OFF*/ % NOPRINT; % INCLUDE GL2/*NOPRINT*/; % PRINT; /**ON*/
  /**OFF*/ % NOPRINT; % INCLUDE GL200/*NOPRINT*/; % PRINT; /**ON*/
END;
PM_TR: PROC(NDX) REORDER ;
   DCL
      NDX FIXED BIN VALUE,
      ONES LITERALLY('(32)''1''B'),
      ZEROS LITERALLY('(32)''0''B'),
      DMASK LITERALLY('''00000001''B'),
      CMASK LITERALLY('''11000100''B'),
      OPTS(8) LABEL,
      BSCH2 ENTRY ( FIXED BIN VAL, (*) FIXED BIN, FIXED BIN VAL)
          RETURNS (FIXED BIN),
      KLD_BY ENTRY (FIXED BIN, BIT(16) ALIGNED) ,
      (A, B, I, J, K, N, S, T, NM, SM, Z) FIXED BIN,
      KX BIT(32) ALIGNED,
      OSTR CHAR(80) VAR,
      ;
      /*IF REGISTER IS ALREADY IN CHAIN, THEN RETURN*/
   IF ¬SUBSTR(ACTIVE((NDX-1)/32), 1+MOD(NDX-1,32), 1) THEN GO TO EXIT;

/*ADD REGISTER TO CHAIN OF REGISTERS BEING TRACED*/
   SUBSTR(ACTIVE((NDX-1)/32), 1 + MOD(NDX-1, 32), 1) = '0'B;

/*IF REGISTER IS TARGET OF MULTIPLE ASSIGNMENT, THEN THIS IS A
      LEAF NODE.  FOR THIS LEAF, ALL ACTIVE REGISTERS ARE KILLED BY A
      STORE INTO THE LEAF NODE*/
   S = LL(NDX);  /*GET REGISTER NUMBER OF NDX-TH REGISTER*/

/*IF REGISTER ALREADY WAS SEEN, QUICK COMPUTATION POSSIBLE
      VIA PUT_BIT*/
   IF SUBSTR(SEEN((NDX-1)/32), 1+MOD(NDX-1,32), 1) THEN DO;
      CALL PUT_BIT(S);
      GO TO QUITX;
      END;

T = -S + ET_SIZE;
   IF SUBSTR(SLV((T-1)/32), 1+MOD(T-1,32), 1)THEN DO;
      T = BSCH2 (KLS, SL, -S);
      IF T <= 0
         THEN CALL XERROR(XE_1053, 0);
         /* 1053C  TABLES INCONSISTANT DURING KILL VECTOR COMPUTATION */

DO J = 0 TO KLNW;
         KL(T,J) = KL(T,J) & ACTIVE(J);
         END/*J*/;
      END;
   Z = OPS_TYPE(ET_OP(S));
   IF Z < 1 | Z > 8 THEN GO TO QUITX;
   GO TO OPTS(Z);

OPTS(6):    /*RRR OPERATIONS*/
               IF ET_RE(S) ¬= 0 THEN
                  CALL PUT_BIT(ET_RE(S));
               IF ET_RD(S) ¬= 0 THEN
                  CALL PUT_BIT(ET_RD(S));
OPTS(2):    /*RR OPERATIONS*/
OPTS(3):    /*RI OPERATIONS*/
               IF ET_RC(S) ¬= 0 THEN
                  CALL PUT_BIT(ET_RC(S));
               IF ET_RB(S) ¬= 0 THEN
                  CALL PUT_BIT(ET_RB(S));
```

```
                    GO TO OPTS(1);
OPTS(5):     /*RSS OPERATIONS*/
                 CALL PUT_STORE (ET_OPR2(S));
OPTS(8):
OPTS(4):     /*RS RSR OPERATIONS*/
                 CALL PUT_STORE (ET_OPR1(S));
                 IF Z¬=5 THEN
                   IF ET_RC(S) ¬= 0 THEN
                      CALL PUT_BIT(ET_RC(S));
                   IF ET_RD(S) ¬= 0 THEN
                      CALL PUT_BIT(ET_RD(S));
OPTS(7):
OPTS(1):

IF OPS_FLAGS (ET_OP (S)) & DMASK THEN   /*DANGEROUS OP*/
                 DANGER((NDX-1)/32) = DANGER((NDX-1)/32) | PICK_BIT(MOD(NDX-1,32));

IF OPS_REGFORM (ET_OP(S)) = 7 THEN /*RESULT IS COND. REG.*/
                 COND_REG((NDX-1)/32) = COND_REG((NDX-1)/32) & ¬PICK_BIT(MOD(NDX-
1,32));
              KX = OPS_KILL(ET_OP(S));
/*

DO WHILE (KX);
                 Z = INDEX(KX, '1'B);
                 SUBSTR(KX,Z,1) = '0'B;    /*RESET BIT*/
                 CALL PUT_BIT(Z);    /*KILL REG Z -> KILL S*/
                 END /*WHILE KX*/;
*/

QUITX:
   SUBSTR(ACTIVE((NDX-1)/32), 1 + MOD(NDX-1, 32), 1) = '1'B;
   SUBSTR(SEEN((NDX-1)/32), 1 + MOD(NDX-1, 32), 1) = '1'B;
EXIT:
   RETURN;

PUT_BIT: PROC (I);
   DCL ( J, K, R, T) FIXED BIN;
   DCL I FIXED BIN VALUE;
   K = BSCH2 (KLN, LL, I);
   IF K = 0 THEN RETURN;
   IF SUBSTR(SEEN((K-1)/32), 1+MOD(K-1,32), 1) THEN DO;
      DO J = 1 TO KLS;
         IF ¬SUBSTR(KL(J, (K-1)/32), 1+MOD(K-1,32), 1) THEN
               /*IF STORAGE AREA J KILLS REGISTER I, THEN ALL ACTIVE
               REGISTERS (I.E. REGISTERS HAVING REGISTER I IN THEIR
               COMPUTATION TREE) ARE ALSO KILLED BY STORAGE AREA J.*/
            DO R = 0 TO KLNW;
               KL(J,R) = KL(J,R) & ACTIVE(R);
               END;
         END /*DO J*/;
      END /*IF SEEN*/;
   ELSE CALL PM_TR(K);
   IF SUBSTR(DANGER((K - 1)/32), 1+MOD(K - 1, 32), 1) THEN
      DO R = 0 TO KLNW;
         DANGER(R) = DANGER(R) | ¬ACTIVE(R);
         END /*DO R*/;
   RETURN;
   END /*PUT_BIT*/;
PUT_STORE: PROC (J);
   DCL (I, K, R) FIXED BIN;
   DCL J FIXED BIN VALUE;
   SELECT (OT_ID(J));
      WHEN (ID_REF)
```

```
            R = BSCH2(KLS, SL, OT_NS(J));
         WHEN (ID_SR)
           R = BSCH2(KLS, SL, -OT_X(J));
         OTHERWISE
            GO TO FINISH;
         END;
      IF R ¬= 0 THEN
         DO I = 0 TO KLNW;
            KL(R,I) = KL(R,I) & ACTIVE(I);
            END;

FINISH:
   IF OT_T(J) > 0 THEN CALL PUT_BIT (OT_T(J));
   IF OT_X(J) > 0 THEN CALL PUT_BIT (OT_X(J));
   IF OT_S(J) > 0 THEN CALL PUT_BIT (OT_S(J));
   IF OT_RBC(J) > 0 THEN CALL PUT_BIT(OT_RBC(J));
   IF OT_B(J) > 0 THEN CALL PUT_BIT(OT_B(J));
   RETURN;
   END /*PUT_STORE*/;

/**OFF*/ % NOPRINT; % INCLUDE GL2/*NOPRINT*/; % PRINT; /**ON*/
   /**OFF*/ % NOPRINT; % INCLUDE GL200/*NOPRINT*/; % PRINT; /**ON*/
   /**OFF*/ % NOPRINT; % INCLUDE FORM/*NOPRINT*/; % PRINT; /**ON*/
   /**OFF*/ % NOPRINT; % INCLUDE GL_OPS/*NOPRINT*/; % PRINT; /**ON*/
   END;
```

APPENDIX 3

```
PM_GBV: PROC(G) REORDER ;
   DCL
      G OFFSET (PROCS) VALUE,
      BSCH2 ENTRY (FIXED BIN VALUE, (*) FIXED BIN, FIXED BIN VALUE)
         RETURNS (FIXED BIN),
      CL_TYPE ENTRY (FIXED BIN VAL) RETURNS (FIXED BIN),
      CFLAG BIT(8),
      ONES LITERALLY('(32)''1''B'),
      ZEROS LITERALLY('(32)''0''B'),
      1 TEMP_VECTORS (0: KLNW),
         2 NT BIT(32) ALIGNED,
         2 DT BIT(32) ALIGNED,
         2 CT BIT(32) ALIGNED,
      KX BIT(32) ALIGNED,
      (I, A, AI, J, K) FIXED BIN,
      ;

/*FOR 801, ALLOW RESULTS OF ALL COMPARES TO COMMON AND MOVE, FOR OTHER
MACHINES, EVERY INSTUCTION WHICH MODIFIES THE COND. REG. KILLS ALL RESULTS
WHICH USE THE COMD. REGISTER.*/
   IF S801 THEN CFLAG = 0; ELSE CFLAG = '11000100'B;

/* THIS PROGRAM PRODUCES THE INITIAL DOWNWARD-EXPOSED AND NOT-KILLED BIT
   VECTORS FOR THE BASIC BLOCKS IN GRAPH G.*/

DO I = G->B_BEGIN TO G->B_END; /*STEP THRU ALL BASIC BLOCKS*/
      IF I = G->B_END THEN KX = ONES;
         ELSE KX = ZEROS;
      A = BL_BEGIN(I);  /*POINT TO FIRST INSTRUCTION IN BASIC BLOCK*/;
      DO J = 0 TO KLNW;
         NT(J) = ONES;   /*INITIALIZE NOT-KILLED TO TRUE FOR ALL EXPRESSIONS*/
         DT(J) = ZEROS;  /*INITIALIZE DOWNWD EXPOSED TO FALSE FOR ALL EXPRS.*/
         CT(J) = KX; /*INITIALIZE C-CLEAR PATHS */
         CLEAR(I, J) = ZEROS;  /*TEMPORARILY, (RE)COMPUTATION OF EXPRESSION*/
         END /*DO J*/;
      if m680 then do;
         do j = fp(i) to fp(i) + np(i) - 1;
```

```
            if el_type(bl_end(pred(j))) = elt_bnway then do;
                DO K = 0 TO KLNW;
                    NT(K) = NT(K) & COND_REG(K);
                    DT(K) = DT(K) & COND_REG(K);
                    END;
                end;
            end;
        end;
    DO WHILE (A ¬= EL_FC(BL_END(I)));
        /*STEP THRU ALL INSTRUCTIONS IN THE BASIC BLOCK.*/
        KX = ¬OPKILLS(A);
        NT(0) = NT(0) & KX;
        DT(0) = DT(0) & KX;
        IF EL_TYPE(A) = ELT_RFC | EL_TYPE(A) = ELT_CALL THEN DO; /*EXAMINE ONLY
COMPUTATIONS*/
            IF EL_STORE(A) THEN DO;   /*SPECIAL CASE FOR STORE INSTRUCTIONS.*/
                J = ET_OPR1(EL_T(A));   /*POINT TO TARGET OF STORE OPERATION*/
                CALL KILL_OPS(J);   /*KILL OPERATIONS AFFECTED BY STORE*/
            END /*IF EL_STORE(A)*/;
            ELSE DO;
                /*THE USUAL CASE.  MARK THE COMPUTATION AS BEING
                  BOTH DOWNWARD EXPOSED AND NOT KILLED BY THE BLOCK.*/
                IF OPS_FLAGS(ET_OP(EL_S(A))) & CFLAG THEN DO;
                    DO K = 0 TO KLNW;
                        NT(K) = NT(K) & COND_REG(K);
                        DT(K) = DT(K) & COND_REG(K);
                        END;
                    END;
                IF EL_T(A) ¬= EL_S(A) THEN CALL KILL_OPS(-EL_T(A));
                IF EL_TYPE(A) = ELT_CALL THEN DO;
                    J = CL_TYPE ( OT_DR(ET_OPR(EL_S(A))));
                    IF J > 0 THEN DO K = 0 TO KLNW;
                        NT(K) = NT(K) & KL(J, K);
                        DT(K) = DT(K) & KL(J,K);
                        CT(K) = CT(K) | ¬(CLEAR(I, K) ) ;
                            /*OBSERVE THAT ALL COMPUTATIONS IN THE
                              BASIC BLOCK THAT HAVEN'T BEEN
                              (RE)COMPUTED HAVE A CLEAR PATH
                              (SINCE THE SUBROUTINE MAY ABORT
                              AND CONSEQUENTLY NOT RETURN!*/
                        END;
                    END;
                ELSE DO;
                    J = BSCH2(KLN, LL, EL_T(A));   /*WHICH COMPUTATION*/
                    IF J > 0 THEN DO;
                        /*SET BITS TO TRUE.*/
                        SUBSTR(NT((J-1)/32), 1 + MOD(J-1,32), 1) = '1'B;
                        SUBSTR(DT((J-1)/32), 1 + MOD(J-1,32), 1) = '1'B;
                        SUBSTR(CLEAR(I, (J-1)/32), 1 + MOD(J-1,32), 1) = '1'B;
                    END;
                END /*RFC*/;
            END /*ELSE DO */;
        END;   /*IF EL_TYPE(A) = RFC THEN DO*/
        A = EL_FC(A);   /*MOVE TO NEXT INSTRUCITON*/
    END; /*DO WHILE (A ¬= EL_FC . . . */

/*PROPAGATE COMPUTED VECTORS TO ALL EDGES EMINATING FROM NODE*/
    DO J = FS(I) TO FS(I) + NS(I) - 1;
        DO K = 0 TO KLNW;
            NOK(J, K) = NT(K);
            DEX(J, K) = DT(K);
            THR(J, K) = NT(K) & ¬DT(K) ;
        END /*DO K*/;
    END /*DO J = */;
```

```
/*SIMILAR COMPUTATION TO DERIVE UPWARD EXPOSED EXPRESSIONS IN A
BASIC BLOCK.  THE CODE IS JUST AS ABOVE, EXCEPT THE INSTRUCTIONS
WITHIN THE BLOCK ARE EXAMINED IN REVERSE ORDER!*/

A = BL_END(I);   /*POINT TO LAST INSTRUCTION IN BASIC BLOCK*/;
DO J = 0 TO KLNW;
    DT(J) = ZEROS;   /*INITIALIZE UPWARD EXPOSED TO FALSE FOR ALL EXPRS.*/
    CLEAR(I, J) = CT(J);   /*EXISTENCE OF C-CLEAR PATHS NOW COMPUTED*/
END /* DO J*/;
DO WHILE (A ¬= EL_BC(BL_BEGIN(I)));
    /*STEP THRU ALL INSTRUCTIONS IN THE BASIC BLOCK IN REVERSE ORDER.*/
    KX = ¬OPKILLS(A) ;
    DT(0) = DT(0) & KX;
    IF EL_TYPE(A) = ELT_RFC | EL_TYPE(A) = ELT_CALL THEN DO; /*EXAMINE ONLY
COMPUTATIONS*/

IF EL_STORE(A) THEN DO;  /*SPECIAL CASE FOR STORE INSTRUCTIONS.*/
            J = ET_OPR1(EL_T(A));   /*POINT TO TARGET OF STORE OPERATION*/
            CALL KILL_OPS(J);   /*KILL OPERATIONS AFFECTED BY STORE*/
        END /*IF EL_STORE(A)*/;
        ELSE DO;
            /*THE USUAL CASE.  MARK THE COMPUTATION AS BEING
            UPWARD EXPOSED IN THE BLOCK.*/

IF OPS_FLAGS(ET_OP(EL_S(A))) & CFLAG THEN DO;
                DO K = 0 TO KLNW;
                    DT(K) = DT(K) & COND_REG(K);
                    END;
                END;
            IF EL_T(A) ¬= EL_S(A) THEN DO;
                CALL KILL_OPS(-EL_T(A));
            END;
            IF EL_TYPE(A) = ELT_CALL THEN DO;
                J = CL_TYPE ( OT_DR(ET_OPR(EL_S(A))));
                IF J > 0 THEN DO K = 0 TO KLNW;;
                    DT(K) = DT(K) & KL(J,K);
                END;
            END /*ELSE IF LOOKING AT A CALL*/;
            ELSE IF EL_T(A) = EL_S(A) THEN DO;
                J = BSCH2(KLN, LL, EL_T(A));
                IF J > 0 THEN DO;
                    /*SET BITS TO TRUE.*/
                    SUBSTR(DT((J-1)/32), 1 + MOD(J-1,32), 1) = '1'B;
                END;
            END;
        END /*ELSE DO */;
    END;   /*IF EL_TYPE(A) = RFC THEN DO*/
    A = EL_BC(A);   /*MOVE TO PREVIOUS INSTRUCITON*/
END; /*DO WHILE (A ¬= EL_BC . . . */ if m680 then do;
    do j = fp(i) to fp(i) + np(i) - 1;
        if el_type(bl_end(pred(j))) = elt_bnway then do;
            DO K = 0 TO KLNW;
                DT(K) = DT(K) & COND_REG(K);
                END;
            end;
        end;
    end;
/*PROPAGATE COMPUTED VECTORS TO ALL EDGES EMINATING FROM NODE*/
    DO K = 0 TO KLNW;
        UEX(I, K) = DT(K);
    END /* DO K*/;
END; /*DO I = G->B_BEGIN . . . */
```

```
   IF INDEBUG('PMV') ¬= 0 THEN
      CALL BOTH ('NODE AND EDGE LIMITS' || LPAD(GMIN,5) ||
              LPAD(GMAX,5) || LPAD(EMIN,5) || LPAD(EMAX,5) ) ;

RETURN;

KILL_OPS: PROC(J);
   DCL J FIXED BIN VALUE;
   DCL (K, L) FIXED BIN;
   DCL V BIT(32) ALIGNED;
```

APPENDIX 4

```
/OFF*******************************************************
*
*     PROCEDURE NAME: CSX3
*
*     PARAMETER DESCRIPTION:
*         PARAMETER 1:  OFFSET OF SEQUENCE OF GRAPH DESCRIPTORS
*
*     RETURNS: MODIFIED EXECUTION LIST, AVAIL BIT VECTORS FILLED IN FOR EACH BASIC
BLOCK.
*
*     PROCEDURE DESCRIPTION:
*         COMPUTES POINTS AT WHICH INSERTIONS OF CODE ARE TO BE MADE, AND CAUSES
*         THE CODE TO BE INSERTED.  COMPUTES EXPRESSIONS WHICH ARE AVAILABLE
*         AT ENTRY TO EVERY BASIC BLOCK.
*
**********************************************************//**ON*/

DCL
   G OFFSET (PROCS) VALUE,
   HISSEZ ENTRY (FIXED BIN VAL, OFFSET VAL),
   HOIST BIT,
   CSX2DBG ENTRY (OFFSET VALUE),
   BSCH2 ENTRY (FIXED BIN VAL, (*) FIXED BIN, FIXED BIN VAL)
      RETURNS (FIXED BIN),
   INS_OP ENTRY ( (*) BIT(32) ALIGNED, FIXED BIN, FIXED BIN VAL),
   PM_ADD2 ENTRY (OFFSET VAL, FIXED BIN VAL) RETURNS (FIXED BIN),
   CSX3A ENTRY (OFFSET VALUE),
   DVECT (0:KLNW) BIT(32) ALIGNED,
   (I, II, JJ, J, K, GNO, N) FIXED BIN,
   ONES BIT(32) ALIGNED STATIC INIT ((32)'1'B),
   ZEROS BIT(32) ALIGNED STATIC INIT ((32)'0'B),
   (H, KK, IX, A, B, BB, X) FIXED BIN,
   LTEMP FIXED BIN,
   INSFLAG BIT,
   FLAG BIT,
   PX OFFSET (INT_LST),
   TEMPB BIT(32) ALIGNED,
   OSTR CHAR(120) VAR,
   ;

CALL CSX3A(G); /*COMPUTE CLEAR (FOR SAFETY) AND THR*/

/*NOW MAKE PASSES OVER GRAPHS TO COMPUTE AVAILABLE EXPRESSIONS,
       AND EXPRESSIONS TO BE INSERTED AT EACH REGION HEAD*/

DO I = G->B_END+1 TO GMAX;   /*GO THRU ALL INTERVALS*/

PX = ILPTR(I);   /*POINT TO NODES IN INTERVAL ORDER*/
```

```
H = PX->BLKLIST(1);   /*POINT TO HEADER NODE H OF INTERVAL I*/
DO J = 0 TO KLNW;
   PV(H,J) = ONES; /*INITIALLY, ALL COMPUTATIONS ARE POSSIBLY AVAILABLE*/
   DV(H,J), UEX(I,J) = ZEROS;/*INITIALLY NO COMPS. ARE AVAILABLE
       ON ENTRY TO INTERVAL*/
   END;
IF FLAG_BIT_8(I) THEN CALL CSX3I /*SPECIAL TREATMENT OF IRREDUCIBLE REGION*/;
ELSE
/*STEP THRU ALL BLOCKS IN INTERVAL ORDER (EXCEPT HEAD)*/
DO J = 1 TO PX -> INTSIZE;
   B = PX -> BLKLIST(J);   /*GET NODE NUMBER*/
      /*ALWAYS POINT TO REPRESENTATIVE NODE FOR INTERVAL HEAD IN FIRST
      ORDER GRAPH*/
   IF J > 1 THEN DO;
      DO K = 0 TO KLNW;
         PV(B,K), DV(B,K) = ONES;   /*INIT P, V FOR NODE (MODIFIED BY '&'*/
         END;
      DO K = FP(B) TO FP(B) + NP(B) - 1;   /*STEP THRU ALL PREDECESSORS*/
         DO IX = 0 TO KLNW; /*STEP THRU ALL WORDS OF BIT VECTOR*/
            PV(B, IX) = PV(B, IX) & (PV(PRED(K), IX) & NOK(COREDGE(K), IX)
                       | DEX(COREDGE(K), IX));
            DV(B, IX) = DV(B, IX) & (DV(PRED(K), IX) & NOK(COREDGE(K), IX)
                       | DEX(COREDGE(K), IX));
            END /*DO IX ... */;
         END /*DO K */;
      END /*IF J > 1*/;
   IF LATCH(B) THEN   /* FOR A LATCH, COMPUTE KILLS FOR HEAD*/
      DO K = FS(B) TO FS(B) + NS(B) - 1;
         IF SUCC(K) = H THEN DO IX = 0 TO KLNW;
            PV(H, IX) = PV(H, IX) & (PV(B, IX) & NOK(K, IX) | DEX(K, IX));
            END /* DO IX*/;
         END /*IF LATCH*/;
END /*ELSE DO J = */;

DO J = 1 TO PX -> INTSIZE;
      /*REFINE THE POSSIBLY-AVAILABLE VECTORS*/
   B = PX -> BLKLIST(J);
      /*ALWAYS POINT TO REPRESENTATIVE NODE FOR INTERVAL HEAD IN FIRST
      ORDER GRAPH*/

DO IX = 0 TO KLNW;
      IF J > 1 & ¬ FLAG_BIT_8(I) THEN
         PV(B, IX) = PV(H, IX) & PV(B, IX) | DV(B, IX);
      /*NOW COMPUTE MOVABLE EXPRESSIONS*/
      UEX(I, IX) = UEX(I, IX) | PV(B, IX) & ¬DV(B, IX) & UEX(B, IX);
         /*UPDATE EXPRESSIONS HAVING C-CLEAR PATHS THRU INTERVAL*/
      END /*DO IX*/;
   END /*DO J*/;

/*NOW, COMPUTE THE NOK AND DEX VECTORS FOR THE EDGES CONNECTING THIS
INTERVAL TO OTHER INTERVALS IN THE CURRENT GRAPH.*/

DO J = FS(I) TO FS(I) + NS(I) - 1;
   JJ = OLDEDGE(J);
   DO K = 1 TO PX->INTSIZE UNTIL (FS(PX->BLKLIST(K)) <= JJ &
           FS(PX->BLKLIST(K))+NS(PX->BLKLIST(K)) > JJ);
   END /*DO K*/ /*FIND NODE CORRESP. TO HEAD OF EDGE OUT OF INTERVAL*/ ;
   IF K > PX->INTSIZE THEN DO; /*OR WHEN EDGE NOT FOUND -- SERIOUS ERROR*/
      CALL XERROR(XE_0810, 0);
      /* 0810U   ERROR IN CONSTRUCTION OF FLOW GRAPH */

RETURN;
      END;
   B = PX->BLKLIST(K);
```

```
         DO IX = 0 TO KLNW;
            NOK(J, IX) = PV(B, IX) & NOK(JJ, IX) | DEX(JJ, IX);
            DEX(J, IX) = (DV(B, IX) |
              UEX(I, IX) & PV(B, IX) & ¬(CLEAR(I,IX) & DANGER(IX))) & NOK(JJ, IX)
              | DEX(JJ, IX);
         END /*DO IX*/;
      END /*DO J = FS(I) ... */;
END /*DO I = */;

IF INDEBUG ('PMCM') THEN CALL CSX2DBG(G);

/*INITIALIZE ALL BITS IN THE AVAILABILTIY VECTOR TO FALSE FOR
         OUTERMOST DERIVED GRAPH*/

DO IX = 0 TO KLNW;
   AVAIL(GMAX,IX) = ZEROS;
END /*DO IX = ... */;

I = BSCH2(KLN, LL, REG_AUTO);
IF I > 0 THEN
   SUBSTR( AVAIL (GMAX, (I-1)/32), 1 + MOD(I-1,32), 1) = '1'B;

/*NOW PASS THRU ALL DERIVED GRAPHS FROM OUTERMOST TO INNERMOST.*/

HOIST = INDEBUG('PMNH') = 0;   /*HOIST ONLY IF DEBUG OPTION PMNH IS OFF*/;
DO I = GMAX TO G->B_END+1 BY -1;

PX = ILPTR(I);   /*POINT TO NODES IN INTERVAL ORDER*/
   H = PX->BLKLIST(1);   /*H IS INTERVAL HEADER (IN FIRST ORDER GRAPH*/;
   TEMPB = (32)'0'B;
   DO IX = 0 TO KLNW;   /*COMPUTE EXPRESSIONS MOVABLE
         IN FRONT OF INTERVAL HEADER NODE*/
      IF I < GMAX THEN
         DVECT( IX) = ¬AVAIL(I,IX) & UEX(I, IX);
      ELSE DVECT(IX) = ZEROS;
   END /*ELSE DO IX = ...*/;

DO IX = 0 TO KLNW;
        /*FIRST DECREASE INSERTABLE COMPUTATIONS BY DANGEROUS ONES WHICH
            HAVE C-CLEAR PATHS*/
      DVECT( IX) = DVECT( IX) & ¬(CLEAR(I, IX) & DANGER(IX));
      TEMPB = TEMPB | DVECT( IX);
   END /*DO IX = ... */;
   IF (TEMPB ¬= (32)'0'B) THEN DO;
      X = PM_ADD2 (G, I);
      CALL INS_OP (DVECT, X, I);
      BL_END(I) = X;   /*FIX BLOCK TABLE */
         /* LET BL_BEGIN POINT TO THE FIRST EXECUTABLE ITEM OF ORIGINAL
            BASIC BLOCK (IT MUST NOT BE LEFT AHEAD OF THE INSERTED INSTRUCTIONS,
            BECAUSE THEY WOULD THEN BE ELIMINATED BY THE COMMONING PASS LATER.*/
   END;
   DO IX = 0 TO KLNW;
      DVECT(IX) = DVECT(IX) | AVAIL(I, IX);
      END;
   DO J = 1 TO PX -> INTSIZE ;
      /*COMPUTE AVAILABLE EXPRESSIONS AT EACH NODE J IN INTERVAL I.*/
      B = PX -> BLKLIST(J);
      DO IX = 0 TO KLNW;
         AVAIL(B, IX) = DVECT(IX) & PV(B, IX) | DV(B, IX);
      END /*DO IX = ... */ ;
   END /*DO J = 1 TO ... */;

IF HOIST THEN   /*DO HOISTING IN REGION*/
      IF (KLNW+1)*(PX->INTSIZE)*24 <= $CTL THEN /*ENOUGH ROOM*/
```

```
         CALL HISSEZ(I,G);   /*DO HOISTING IN REGION I*/

END /*DO I ... */;

RETURN;

CSX3I: PROC CLOSED;
   DCL (B, J, K, IX, L, M) FIXED BIN;
   DCL (S1, S2) BIT(32) ALIGNED;
   DCL TEST BIT(1);
   M = 0;  /*KEEP TRACK OF MAXIMUM NUMBER OF ITERATIONS USED*/
   DO J = 2 TO PX->INTSIZE; /*INITIALIZE BIT VECTORS FOR NODES IN REGION*/
      B = PX -> BLKLIST(J);
      DO IX = 0 TO KLNW;
         PV(B, IX), DV(B, IX) = ONES;
         END;
      END;
   DO IX = 0 TO KLNW;
      TEST = '1'B;
      DO L = 1 REPEAT (L+1) WHILE (TEST);
         TEST = '0'B;/*TEST WILL BE SET TRUE IF A BIT VECTOR CHANGES, THUS
                   CAUSING YET ANOTHER ITERATION*/
         DO J = 2 TO PX -> INTSIZE;
            B = PX -> BLKLIST(J);   /*GET NODE NUMBER*/
            /*ALWAYS POINT TO REPRESENTATIVE NODE FOR INTERVAL HEAD IN FIRST
            ORDER GRAPH*/
            S1, S2 = ONES;   /*INIT P, V FOR NODE (MODIFIED BY '&'*/
            DO K = FP(B) TO FP(B) + NP(B) - 1;   /*STEP THRU ALL PREDECESSORS*/
               S1 = S1 & (PV(PRED(K), IX) & NOK(COREDGE(K), IX)
                       | DEX(COREDGE(K), IX));
               S2 = S2 & (DV(PRED(K), IX) & NOK(COREDGE(K), IX)
                       | DEX(COREDGE(K), IX));
               END /*DO K */;
            IF S1 ¬= PV(B, IX) THEN DO;
               TEST = '1'B;
               PV(B, IX) = S1;
               END;
            IF S2 ¬= DV(B, IX) THEN DO;
               TEST = '1'B;
               DV(B, IX) = S2;
               END;
            END   /*DO J*/;
         DO K = FP(H) TO FP(H) + NP(H) - 1;
            B = PRED(K);   /*EXAMINE HEAD'S PREDECESSORS*/
            IF NEWBLK(B) = I THEN DO;   /*IF PRECESESSOR IS IN REGION*/
               S1 = PV(H, IX) & (PV(B, IX) & NOK(COREDGE(K), IX)
                          | DEX(COREDGE(K), IX));
               IF S1 ¬= PV(H, IX) THEN DO;
                  TEST = '1'B;
                  PV(H, IX) = S1;
                  END;
               END /*IF NEWBLK(B) = I*/;
            END /*DO K*/;
         END /*DO WHILE*/;
      M = MAX (M, L); /*KEEP TRACK OF MAX. NO. OF ITERATIONS*/
      END /*DO IX*/;
   IF INDEBUG ('PMD') THEN DO;
      CALL BOTH ('MAXIMUM ITERATIONS FOR INTERVAL'||LPAD(I,5)||' IS'||
         LPAD(M,5) );
      END;
   RETURN;
END;

/**OFF*/ % NOPRINT; % INCLUDE FORM/*NOPRINT*/; % PRINT; /**ON*/
```

```
/**OFF*/ % NOPRINT; % INCLUDE GL2/*NOPRINT*/; % PRINT; /**ON*/
/**OFF*/ % NOPRINT; % INCLUDE GL3/*NOPRINT*/; % PRINT; /**ON*/
/**OFF*/ % NOPRINT; % INCLUDE GL200/*NOPRINT*/; % PRINT; /**ON*/

END    /*CSX3*/   ;
```

APPENDIX 5

```
INS_OP: PROC (V, A, I_VAL) ;

/*THIS ROUTINE INSERTS INTO THE EXECUTION LIST AT POINT A,
    THE COMPUTATIONS INDICATED BY 1 BITS IN VECTOR V*/
    /*INSERTIONS ARE MADE IF AND ONLY IF ALL THE OPERANDS TO AN OPERATION
    ARE AVAILABLE.  THIS MEANS THAT THEY ARE AVAILABLE AS GIVEN BY THE
    AVAIL VECTOR, OF THAT THEY WILL BE INSERTED ALSO, IN WHICH
    CASE THE INSERTION IS DONE FIRST.  FINALLY, THE INSERTION VECTOR
    V HAS ALL AVAILABLE EXPRESSIONS "OR-ED" INTO IT, SO THAT ON EXIT
    FROM THIS ROUTINE, V REPRESENTS ALL AVAILABLE EXPRESSION ON ENTRY
    TO THE INTERVAL*/

DCL
        I_VAL FIXED BIN VAL,
        V(*) BIT(32) ALIGNED,
        TEMP(0:KLNW) BIT(32) ALIGNED,
        (A, N) FIXED BIN,
        (I, J, K, M, Z, SP) FIXED BIN,
        KX BIT(32) ALIGNED,
        BSCH2 ENTRY(FIXED BIN VAL, (*) FIXED BIN, FIXED BIN VAL)
            RETURNS (FIXED BIN),
        PM_BSR  ENTRY(FIXED BIN VALUE) RETURNS(BIT),
        OBLKTB ENTRY,
        STACK(100) FIXED BIN,
        OP(2:6) LABEL,
    ;

DO I = 0 TO KLNW;
        TEMP(I) = V(I);
    END;
    SP = 0;    /*INITIALIZE STACK TO EMPTY*/
    DO I = 0 TO KLNW;
        DO WHILE (TEMP(I) ¬= (32)'0'B);
            J = INDEX(TEMP(I), '1'B);
            K = 32*I + J;
            IF K > KLN THEN GO TO VOID;
            M = LL(K);
RECUR:
            Z = OPS_TYPE(ET_OP(M)); /* CLASSIFY OPERATION*/
            IF Z=8 THEN Z=4;
            IF (Z>1 & Z < 7) THEN GO TO OP(Z); /*EXAMINE INPUTS*/
            GO TO NOACTN; /*DON'T ADD IF NOT TYPES 2-6*/

/*IF ANY OPERAND OF M IS ALSO IN THE LIST TO BE INSERTED,
            PLACE M ON THE STACK, AND FIRST TRY TO INSERT THE OPERAND.
            ONLY AFTER THE OPERAND HAS BEEN INSERTED, DO WE RETURN TO M,
            IN WHICH CASE WE EXAMINE ALL OF THE INPUTS TO M.*/

OP(6):      IF ET_RE(M) > 0 THEN IF TEST(ET_RE(M)) THEN GO TO RECUR;
            IF ET_RD(M) > 0 THEN IF TEST(ET_RD(M)) THEN GO TO RECUR;
OP(3):
OP(2):      IF ET_RC(M) > 0 THEN IF TEST(ET_RC(M)) THEN GO TO RECUR;
            IF ET_RB(M) > 0 THEN IF TEST(ET_RB(M)) THEN GO TO RECUR;
            GO TO OK;
OP(5):      IF ST_TEST(ET_OPR2(M)) THEN GO TO RECUR;
OP(4):      IF ST_TEST(ET_OPR1(M)) THEN GO TO RECUR;
            IF Z=4 THEN
```

```
      IF ET_RC(M) > 0 THEN IF TEST(ET_RC(M)) THEN GO TO RECUR;
      IF ET_RD(M) > 0 THEN IF TEST(ET_RD(M)) THEN GO TO RECUR;
OK:
              A = ELNEW(A);    /*GET POINTER TO NEW INSTRUCTION*/
              EL_TYPE(A) = ELT_RFC;  /*INDICATE THAT IT IS A COMPUTATION*/
              EL_T(A), EL_S(A) = M;  /*POINT TO EXPRESSION TABLE*/
NOACTN:   SUBSTR(TEMP((K-1)/32), 1+MOD(K-1,32), 1) = '0'B;  /*COMP. PROCESSED*/
          IF SP > 0 THEN DO;   /*IF THERE ARE COMPUTATIONS TO UNSTACK*/
              IF SP = 101 THEN DO;
                  /*OVERFLOWED STACK CONDITION.  FIRST, ELIMINATE M FROM TEMP*/
                  SP = 100;
              END /*OVERFLOWED STACK PROCESSING*/;
              M = STACK (SP);    /*LAST COMPUTATION HAVING UNCOMPUTED INPUT*/
              K = BSCH2(KLN, LL, M);
              SP = SP - 1;   /* LOOK AGAIN FOR UNCOMPUTED INPUTS TO M*/
              GO TO RECUR;
          END /* UNSTACKING OPERATION*/;
      END /*DO WHILE*/;
   END /*DO I = */;
VOID:

RETURN;

TEST: PROC (N) RETURNS (BIT);
   DCL N FIXED BIN VALUE;
   DCL (X, OP, DRX, NSX) FIXED BIN;
   X = BSCH2(KLN, LL, N);   /*IS N AN INTERESTING COMPUTATION?*/
LOOP:
   IF X > 0 THEN
       IF SUBSTR(TEMP((X-1)/32), 1+MOD(X-1,32), 1) THEN DO; /*IS N COMPUTED?*/
          IF SP < 100 THEN DO  /*NO.  MAKE SURE THERE IS ROOM ON THE STACK*/;
              SP = SP + 1;
              STACK(SP) = M;    /*STACK M, THE CURRENT COMPUTATION, AND*/
          END;
          ELSE SP = 101;  /*INDICATE STACK OVERFLOW*/;
          M = N;   /*MAKE THE COMPUTATION N THE OBJECT OF INTEREST*/
          K = X;   /*THE COMPUTATIONS POSITION IN SORTED LIST*/
          RETURN ('1'B);
       END /* TEST FOR NEED TO STACK COMPUTATION*/;
       ELSE IF SUBSTR(V((X-1)/32) |
              AVAIL (I_VAL, (X-1)/32), 1+MOD(X-1,32), 1)= '0'B THEN DO;
              /*IF OPERAND IS NOT AVAILABLE, ITS COMPUTATION WILL
              BE INSERTED, UNLESS THAT COMPUTATION IS A
              LOAD OF A VARIABLE WHICH HAS BECOME AN SR*/
          OP = ET_OP(N);
/*       IF (OP=OP_L | OP=OP_LHA | OP=OP_LHZ | OP=OP_LC) THEN
              IF PM_BSR(N) THEN RETURN('0'B);
*/
          SUBSTR(V((X-1)/32), 1+MOD(X-1,32), 1) = '1'B;
          SUBSTR(TEMP((X-1)/32), 1+MOD(X-1,32), 1) = '1'B;
          GO TO LOOP;
          END;
   RETURN ('0'B);
   END /*TEST*/;

ST_TEST: PROC(W) RETURNS(BIT);
   DCL W FIXED BIN VALUE;
   IF OT_T(W) > 0 THEN
       IF TEST(OT_T(W)) THEN RETURN ('1'B);
   IF OT_X(W) > 0 THEN
       IF TEST(OT_X(W)) THEN RETURN ('1'B);
   IF OT_S(W) > 0 THEN
       IF TEST(OT_S(W)) THEN RETURN ('1'B);
   IF OT_RBC(W) > 0 THEN
       IF TEST(OT_RBC(W)) THEN RETURN('1'B);
```

```
   IF OT_B(W) > 0 THEN RETURN ( TEST(OT_B(W)) );
   RETURN ('0'B);
   END;

%NOPRINT;
    % INCLUDE GL1 ;

% INCLUDE GL2 /* ENTRY DECLARATIONS */;

% INCLUDE GL200 /* XEQ LST, EXPTAB & SEMANTIC STACK */;

% INCLUDE GL3 /* FOR D_NAME, D_NAMEL, AND DA_STR */;

% INCLUDE GL_OPS /* FOR OP CODE TABLES */;

% INCLUDE GL6;
    % INCLUDE GL_OPR;
    % INCLUDE FORM;
%PRINT;
END /*INS_OP*/;
```

APPENDIX 6

```
CSX2A: PROC(G) REORDER;

/*OFF***************************************************************
*
*     PROCEDURE NAME: CSX2A
*
*     PARAMETER DESCRIPTION:
*         PARAMETER 1: G  OFFSET OF GRAPH DESCRIPTORS FOR PROC BEING OPTIMIZED
*
*     RETURNS: MODIFIED EXECUTION LIST
*
*     PROCEDURE DESCRIPTION:
*         USES CSX3 TO COMPUTE AVAIL INFO.  THEN WALKS BASIC BLOCKS ELIMINATING
*             REDUNDANT COMPUTATIONS BASED ON AVAIL BIT VECTOR.
*
***********************************************************************//**ON*/

DCL
      G OFFSET (PROCS) VALUE ,
      ZEROS BIT(32) ALIGNED STATIC INIT ((32)'0'B),
      BSCH2 ENTRY (FIXED BIN VAL, (*) FIXED BIN, FIXED BIN VAL)
         RETURNS (FIXED BIN),
      CL_TYPE ENTRY (FIXED BIN VAL) RETURNS (FIXED BIN),
      CSX3 ENTRY(OFFSET VAL),
      NT(0:KLNW) BIT(32) ALIGNED,
      (I, A, AI, J, JJ, K) FIXED BIN,
      KX BIT(32) ALIGNED,
      LP BIT,
      CFLAG BIT (8),
      ;

CALL CSX3(G);  /*COMPUTE AVAIL AND INSERT BITS*/

/*FOR 801, ALLOW RESULTS OF ALL COMPARES TO COMMON AND MOVE, FOR OTHER
MACHINES, EVERY INSTUCTION WHICH MODIFIES THE COND. REG. KILLS ALL RESULTS
WHICH USE THE COMD. REGISTER.*/
   IF S801 THEN CFLAG = 0; ELSE CFLAG = '11000100'B;

/*AVAILABLE COMPUTATION VECTORS ARE NOW AVAILABLE!
   GLOBAL COMMON SUBEXPRESSIN ELIMINATION FOLLOWS!!*/
```

```
DO I = G->B_BEGIN+1 TO G->B_END; /*STEP THRU ALL BASIC BLOCKS*/
   DO J = 0 TO KLNW;
      NT(J) = AVAIL(I, J);  /*AVAILABLE EXPRESSIONS FOR THIS BASIC BLOCK*/
   END /*DO J*/;
   A = BL_BEGIN(I);  /*POINT TO FIRST INSTRUCTION IN BASIC BLOCK*/;
   DO WHILE (A ¬= EL_FC(BL_END(I)));
      KX = ¬OPKILLS(A);
      /*STEP THRU ALL INSTRUCTIONS IN THE BASIC BLOCK.*/
      AI = EL_FC(A);
      IF EL_TYPE(A) = ELT_RFC | EL_TYPE(A) = ELT_CALL THEN DO;
            /*EXAMINE ONLY COMPUTATIONS*/
         IF EL_STORE(A) THEN DO;  /*SPECIAL CASE FOR STORE INSTRUCTIONS.*/
            J = ET_OPR1(EL_T(A));  /*POINT TO TARGET OF STORE OPERATION*/
            CALL KILL_OPS(J);  /*KILL OPERATIONS AFFECTED BY STORE*/
         END /*IF EL_STORE(A)*/;
         ELSE DO;

/*LOOK FOR REDUNDANT INSTRUCTION*/
            IF EL_S(A) ¬= EL_T(A) THEN DO;
            /*RESULT FORCED INTO SECOND REGISTER*/
               CALL KILL_OPS(-EL_T(A));
            END;  /*IF EL_S(A) ¬= EL_T(A)) ... */
            J = BSCH2(KLN, LL, EL_T(A));  /*WHICH COMPUTATION*/
            IF EL_TYPE(A) = ELT_CALL THEN DO;
                /*SUBROUTINE CALLS KILL SOME COMPUTATIONS*/
               JJ = CL_TYPE (OT_DR (ET_OPR( EL_S (A))));
               IF JJ > 0 THEN DO K = 0 TO KLNW;  /*NOT A CALL TO A BUILT-IN SUB*/
                  NT(K) = NT(K) & KL(JJ, K);  /*KILL!*/
               END /*IF JJ > 0 THEN DO K ...*/;
               /*CALLS DON'T COMMON- SO TURN OFF AVAILABLE BIT*/
               IF J > 0 THEN
                  SUBSTR(NT((J-1)/32), 1 + MOD(J-1,32), 1) = '0'B;
            END /*KILLING ON SUBROUTINE CALLS*/;
            IF J ¬= 0 THEN DO;
               IF SUBSTR(NT((J-1)/32), 1 + MOD(J-1,32), 1) = '1'B THEN DO;
                    /*AVAILABLE EXPRESSION -- PITCH*/
                  IF A = BL_END(I) THEN DO;/*KEEP BLOCK TABLES CONSISTANT*/
                     IF A = BL_BEGIN(I) THEN DO;
                        K = ELNEW(EL_BC(A));
                        BL_BEGIN(I) = K;
                        EL_TYPE(K) = ELT_LBL;
                        EL_LABEL(K) = EL_GLBL;
                        EL_GLBL = EL_GLBL - 1;
                     END;
                     BL_END(I) = EL_BC(A);  /*IF 1ST OR LAST INSTRUCTION*/
                  END;
                  ELSE IF A = BL_BEGIN(I) THEN  /*GETS REMOVED*/
                     BL_BEGIN(I) = EL_FC(A);
                  CALL ELDEL(A);  /*REMOVE UNNEEDED INSTRUCION*/
               END /*THEN DO*/;
               ELSE DO;  /*IN ANY CASE, COMPUTATION IS AVAIL.*/
                  NT(0) = NT(0) & KX;  /*KILL REAL REGS*/
                  IF OPS_FLAGS(ET_OP(EL_S(A))) & CFLAG THEN DO;
                     DO K = 0 TO KLNW;
                        NT(K) = NT(K) & COND_REG(K);
                     END;
                  END;
                  SUBSTR(NT((J-1)/32), 1 + MOD(J-1,32), 1) = '1'B;
               END;  /*IF J ¬= 0 THEN DO*/
            END /*ELSE DO */;
      END;  /*IF EL_TYPE(A) = RFC THEN DO*/
      A = AI;  /*MOVE TO NEXT INSTRUCITON*/
   END; /*DO WHILE (A ¬= EL_FC . . . */
```

```
END_I:
    END; /*DO I = G->B_BEGIN . . . */
    RETURN;

KILL_OPS: PROC(J);
    DCL (I, K) FIXED BIN;
    DCL J FIXED BIN VALUE;
    NT(0) = NT(0) & KX;
    /*ONLY DO KILLING FOR STORAGE REFERENCE TARGETS.*/
    IF J >= 0 THEN IF OT_ID(J) ¬= ID_REF THEN RETURN;
IF J > 0 THEN
    I = BSCH2 (KLS, SL, OT_NS(J));
ELSE
    I = BSCH2 (KLS, SL, J);
IF I > 0 THEN DO K = 0 TO KLNW;;
    NT(K) = NT(K) & KL(I,K);
END;
RETURN;
END;

/***OFF*/ % NOPRINT; % INCLUDE GL2/*NOPRINT*/; % PRINT; /***ON*/
        /***OFF*/ % NOPRINT; % INCLUDE GL200/*NOPRINT*/; % PRINT; /***ON*/
        /***OFF*/ % NOPRINT; % INCLUDE GL_OPR/*NOPRINT*/; % PRINT; /***ON*/
        /***OFF*/ % NOPRINT; % INCLUDE FORM/*NOPRINT*/; % PRINT; /***ON*/
END     /*CSX2A*/   ;
```

Having thus described our invention, what we claim as new, and desire to secure by Letters Patent is:

1. A method in an electronic computing system within the code optimization phase of an optimizing compiler resident therein for doing global common subexpression elimination and code motion procedures, said method operating on an intermediate language representation of a program in which the basic blocks have been identified,
   separately identifying in said system 'basis' items in each basic block for subsequent processing in said system wherein each 'basis' item comprises an operand which has not been previously defined within that block.

2. A method operable within an optimizing compiler as set forth in claim 1, further including creating a list of Kill Sets for each 'basis' items which specifies each non 'basis' items which depends on the 'basis' items for its value.

3. A method operable within an optimizing compiler as set forth in claim 2 including computing the sets UEX, DEX and THRU using the claimed 'Basis' and Kill Set data.

4. A method operable within an optimizing compiler as set forth in claim 3 wherein UEX, DEX and THRU are computed by:
   initializing DEX and UEX to the empty set, initializing THRU to the set of all computations of interest,
   remaining the kill set of recomputed 'basis' items from DEX, and THRU as 'basis' items are computed,
   examining the instructions in the basic block in execution order,
   adding to DEX every non 'basis' computation encountered,
   adding to UEX every non 'basis' computation encountered, providing it is also in THRU,
   removing from DEX and removing from THRU any members, which are also members of the 'basis' item's kill set whenever a 'basis' item is computed.

5. A method operable within an optimizing compiler as set forth in claim 4 wherein UEX, is computed by:
   initializing UEX to the empty set,
   examining the instructions in the basic block in reverse execution order,
   adding to UEX every non 'basis' computation encountered,
   removing from UEX any members, which are also members of the 'basis' item's kill set whenever a 'basis' item is computed.

6. A method in an electronic computing system during the optimization phase of an optimizing compiler resident therein for performing global common subexpression elimination an code motion which comprises:
   determining in said system the 'basis' for the intermediate language representation of the program being compiled,
   determining in said system the 'basis' items on which each computation depends,
   determining in said system the "kill set" for each 'basis' item,
   determining in said system UEX, DEX, and THRU for each basis block using the previously determined 'basis' and "kill set" information,
   computing in said system AVAIL and INSERT from UEX, DEX, and THRU, making in said system appropriate code insertions at those locations indicated by said preceding step, and
   removing in said system redundant code using the AVAIL set.

7. A method in an electronic computing system within an optimizing compiler resident therein during the global common subexpression elimination and code motion phase which provides a mechanism for allowing larger sets to be recognized for UEX, DEX and/or THRU, said method comprising:

examining and identifying in said system in each basic block 'basis' items which are used as operands without having been previously defined within that basic block, determining in said system for each non 'basis' item the subset of 'basis' items on which it depends, replacing in said system each non 'basis' item by the 'basis' items on which that operand depends, using in said system the sets formed above locating and identifying the collection of non 'basis' items, called the "kill set" of the 'basis' item, forming in said system the sets DEX, UEX, and THRU for each basic block comprising:

initializing in said system DEX and UEX to the empty set, initializing in said system THRU to the set of all computations of interest, examining in said system the instructions in the basic block in execution order, adding in said system to DEX every non 'basis' computation encountered, adding in said system to UEX every non 'basis' computation encountered, providing it is also in THRU, removing from DEX and remove from THRU in said system any members, which are also members of the basis item's "kill set" whenever a 'basis' item is computed.

8. A method operable within an optimizing compiler as set forth in claim 7 including deriving the set of available computations (AVAIL) from UEX, DEX and THRU, examining each instruction of a basic block in execution order, discarding a computation as redundant if it is in AVAIL, if a computation of a non 'basis' item is not in AVAIL, adding the non 'basis' item to the set of available computations, AVAIL if the instruction computes a non 'basis' items for the computation of a 'basis' item, removing from AVAIL the members of the 'basis' item's kill set which are currently also members of AVAIL.

* * * * *